United States Patent
Huang et al.

(10) Patent No.: US 11,658,504 B2
(45) Date of Patent: May 23, 2023

(54) CHARGE CIRCUIT, CONTROL BOX AND LUMINAIRE

(71) Applicant: Aputure Imaging Industries Co., Ltd., Shenzhen (CN)

(72) Inventors: Yi Huang, Shenzhen (CN); Xiangjun Zhou, Shenzhen (CN); Yi Xie, Shenzhen (CN)

(73) Assignee: Aputure Imaging Industries Co., Ltd., Shenzhen (CN)

( * ) Notice: Subject to any disclaimer, the term of this patent is extended or adjusted under 35 U.S.C. 154(b) by 166 days.

(21) Appl. No.: 17/123,322

(22) Filed: Dec. 16, 2020

(65) Prior Publication Data
US 2021/0359538 A1    Nov. 18, 2021

(30) Foreign Application Priority Data
May 13, 2020    (CN) .......................... 202020785554.8

(51) Int. Cl.
*H02J 7/04*    (2006.01)
*H02J 7/00*    (2006.01)
*F21V 23/00*    (2015.01)

(52) U.S. Cl.
CPC .............. *H02J 7/04* (2013.01); *F21V 23/003* (2013.01); *H02J 7/0013* (2013.01); *H02J 7/0047* (2013.01); *H02J 7/007192* (2020.01)

(58) Field of Classification Search
CPC .......... H02J 7/04; H02J 7/0013; H02J 7/0047; H02J 7/007192; F21V 23/003
See application file for complete search history.

(56) References Cited

U.S. PATENT DOCUMENTS 11,011,925 B2 *   5/2021   Zhang ............... H02J 7/007192
2011/0193525 A1 *   8/2011   Ro ........................ H02J 7/0016
                                                                      320/116

* cited by examiner

*Primary Examiner* — Carlos Amaya
(74) *Attorney, Agent, or Firm* — Brooks Kushman P.C.; John E. Nemazi (57) ABSTRACT

The present application relates to the technical field of electronic circuits, and provides a charge circuit, a control box and a luminaire. The charge circuit includes a control circuit and at least one constant current charge circuit. The constant current charge circuit is electrically connected to the rechargeable battery. The control circuit is used to obtain the specification information of the rechargeable battery, and configure the corresponding charging parameters to be sent to the corresponding constant current charge circuit, so as to charge the rechargeable battery through the constant current charge circuit. As a result, the effect of automatically recognize rechargeable batteries of different specifications can be realized, and meet the situation where the rechargeable batteries of different specifications can be simultaneously charged through multiple channels, which solves the problem that the existing technology of lithium battery charging cannot satisfy simultaneously charging lithium batteries of different specifications.

12 Claims, 5 Drawing Sheets

CHARGE CIRCUIT, CONTROL BOX AND LUMINAIRE

CROSS-REFERENCE TO THE RELATED APPLICATION

Pursuant to 35 U.S.C. § 119 and the Paris Convention Treaty, this application claims the benefit of Chinese Patent Application No. 202020785554.8 filed May 13, 2020, the contents of which are incorporated herein by reference.

TECHNICAL FIELD

The present application relates to the technical field of electronic circuits, and more particularly to a charge circuit, a control box and a luminaire.

BACKGROUND

The application of lithium battery charging systems is becoming more and more widespread due to charging and discharging functions of the lithium battery. Currently, lithium battery charging systems on the market generally have a narrow compatible voltage range and there is a problem that a single system can not charge lithium batteries of different specifications at the same time, thus it cannot meet the application scenarios with complex battery usage requirements.

Therefore, the existing technology of lithium battery charging has the problem of being unable to simultaneously charge lithium batteries of different specifications.

SUMMARY

An object of the present application is to provide a charge circuit, a control box, and a luminaire, aiming to solve the problem that the existing technology of lithium battery charging cannot satisfy the need of charging lithium batteries of different specifications simultaneously.

The first aspect of the present application provides a charge circuit, including:

At least one constant current charge circuit, the constant current charge circuit is configured to be electrically connected to a rechargeable battery; and A control circuit which is electrically connected to the constant current charge circuit, where the control circuit is also configured to be electrically connected to the rechargeable battery and obtain its corresponding specification information, and configure corresponding charging parameters to be sent to the constant current charge circuit, so as to charge the rechargeable battery through a constant current charge circuit.

Compared with the traditional solution, the above-mentioned charge circuit uses at least one constant current charge circuit, which achieves the effect of automatically recognize the rechargeable batteries of different specifications, and meet the situation where the rechargeable batteries of different specifications can be simultaneously charged through multiple channels.

In one of the embodiments, the constant current charge circuit includes a constant current switch-mode power supply control chip;

A control pin of the constant current switch-mode power supply control chip is connected to the control circuit, and a drive pin of the constant current switch-mode power supply control chip is connected to the rechargeable battery.

In this way, the constant current charge circuit uses a constant current switch-mode power supply control chip, which is easy to implement.

In one of the embodiments, the control circuit includes a master chip;

The master chip has a collection pin and an enable pin, the collection pin is connected to the rechargeable battery for obtaining its corresponding specification information, and the enable pin is connected to the constant current charge circuit for sending the charging parameters to the constant current charge circuit. Therefore, the master chip obtains the specification information of the rechargeable battery through the collection pin, and drives the constant current charge circuit to charge the rechargeable battery through the enable pin.

In one of the embodiments, when at least one constant current charge circuit is a plurality of constant current charge circuits, there are multiple collection pins, and multiple enable pins;

Among them, one of the constant current charge circuits is connected to one of the enable pins, and one of the rechargeable batteries is connected to one of the collection pins. When there are multiple constant current charge circuits, and the number is not very large, the use of a multi-pin master chip can make the whole circuit more integrated.

In one of the embodiments, the charge circuit further includes a plurality of switch chips;

Each of the switch chips is connected to each of the constant current charge circuits in a one-to-one correspondence, and input pins of a plurality of the switch chips are connected in common to the control circuit, and the switch chip is configured to be switched on when a switching signal output by the control circuit is received, thereby instructing the corresponding constant current charge circuit to work. In this embodiment, multiple switch chips are provided to form branches, and are uniformly controlled by the control circuit. By introducing multiple switch chips to reduce the number of pins of the master chip, the cost can be effectively reduced.

In one of the embodiments, the constant current charge circuit includes:

A drive sub-circuit which is configured to output a drive signal after receiving an enable signal output by the control circuit;

A current limit sub-circuit which is connected to the drive sub-circuit, and configured to receive the drive signal and convert it into a corresponding charging signal according to the charging parameters, so as to charge the rechargeable battery with constant current; and A switch sub-circuit which is connected to the drive sub-circuit and the current limit sub-circuit, and configured to be turned on only when the drive signal is received, otherwise it is off.

In this embodiment, the constant current charge circuit is functionally divided into a drive sub-circuit, a current limit sub-circuit and a switch sub-circuit.

In one of the embodiments, the current limit sub-circuit includes a first resistor, a third resistor, a fourth resistor, a seventh resistor, a tenth resistor, an eleventh resistor, a thirteenth resistor, a fifteenth resistor, a eighteenth resistance, a nineteenth resistance, a twentieth resistance, a third switch, a fifth switch, a eighth switch and a ninth switch;

A first end of the tenth resistor, an output end of the ninth switch and a first end of the eleventh resistor are connected in common. A controlled end of the eighth switch, a second end of the tenth resistor and a first end of the first resistor are connected in common. An input end of the eighth switch is connected to a first end of the nineteenth resistor. A controlled end of the ninth switch, a second end of the eleventh resistor and a first end of the seventh resistor are connected in common. An input end of the ninth switch is connected to a first end of the twentieth resistor. A second end of the first resistor is connected to an input end of the third switch. A first end of the eighteenth resistor is connected to the drive sub-circuit. A second end of the eighteenth resistor, a second end of the nineteenth resistor and a second end of the twentieth resistor are connected in common. A controlled end of the third switch, a first end of the third resistor and a first end of the fourth resistor are connected in common. An output end of the third switch and a second end of the fourth resistor are grounded. A second end of the third resistor is connected to a corresponding rechargeable battery. A second end of the seventh resistor is connected to an input end of the fifth switch. A controlled end of the fifth switch, a first end of the thirteenth resistor and a first end of the fifteenth resistor are connected in common. An output end of the fifth switch and a second end of the fifteenth resistor are grounded. A second end of the thirteenth resistor is connected to a corresponding rechargeable battery. This embodiment limits the specific circuit structure of the above-mentioned current limit sub-circuit.

In one of the embodiments, the switch sub-circuit includes a twentieth capacitor, a twenty-fifth capacitor, a twenty-third resistor, a twenty-seventh resistor, a thirty-first resistor, a thirty-fourth resistor, a third resistor, a thirty-sixth resistor, a tenth switch, a eleventh switch and a twelfth switch;

An input end of the tenth switch is connected to the drive sub-circuit. An output end of the tenth switch, a first end of the twenty-third resistor, a first end of the twentieth capacitor and an output end of the eleventh switch are connected in common. A controlled end of the tenth switch, a second end of the twenty-third resistor, a second end of the twentieth capacitor, a controlled end of the eleventh switch and a first end of the twenty-seventh resistor are connected in common. An input end of the eleventh switch is connected to a first end of the thirty-first resistor. A second end of the thirty-first resistor is connected to a first end of the thirty-fifth resistor. A second end of the thirty-fifth resistor is grounded. A second end of the twenty-seventh resistor is connected to an input end of the twelfth switch. A controlled end of the twelfth switch, a first end of the thirty-fourth resistor and a first end of the thirty-sixth resistor are connected in common. A second end of thirty-fourth resistor is connected to a first end of the twenty-fifth capacitor. A second end of the thirty-sixth resistor and a second end of the twenty-fifth capacitor are grounded. This embodiment limits the specific circuit structure of the above-mentioned switch sub-circuit.

In one of the embodiments, the charge circuit further includes any one or more of a display circuit, a key circuit, and a temperature detection circuit;

A display circuit is connected to the control circuit, and is configured to display a status information of at least one of the constant current charge circuit and the charging parameters of the rechargeable battery;

The key circuit is connected to the control circuit, and is configured to transmit the received key signal to the control circuit to instruct the control circuit to adjust the corresponding charging parameters;

The temperature detection circuit is connected to the control circuit, and is configured to detect a temperature in a preset area and feed it back to the control circuit to instruct the control circuit to adjust the corresponding charging parameters.

The above solution may be expanded. The charge circuit can also display the status information of the constant current charge circuit and the charging parameters of the rechargeable battery through the display circuit, or adjust the charging parameters through the key circuit according to the received key signal, and through the temperature detection circuit adjusts the charging parameters according to the detected temperature, such that the adjustment of the charging parameters are more diversified and more flexible.

The second aspect of the present application provides a control box, including:

An AC input interface which is configured for connecting to mains;

Multiple sets of rechargeable batteries which are electrically connected to the AC input interface, and the multiple sets of the rechargeable batteries are configured to receive main power through the AC input interface for charging themselves; and The charge circuit as described above which is electrically connected to the multiple sets of the rechargeable batteries, and the charge circuit is configured to charge the rechargeable batteries.

The control box in accordance with the embodiments of the present application, on the one hand, the multiple sets of internal rechargeable batteries can be charged through mains power, on the other hand, the rechargeable batteries can be charged through the charge circuit when the mains power is abnormal or cut off. This ensures that the control box remains in a normal working state even when the mains power is abnormal or cut off, thus the user experience is improved.

A third aspect of the present application provides a luminaire, which includes a lamp body and a control box as described above, and the control box is electrically connected to the lamp body for supplying power to the lamp body.

The luminaire in accordance with the embodiment of the present application uses a control box to supply power to the lamp body, which facilitates the miniaturization of the product and reduces the cost.

The present application provides a charge circuit, a control box, and a luminaire. The charge circuit includes a control circuit and at least one constant current charge circuit. The constant current charge circuit is electrically connected to the rechargeable battery, and the control circuit is used to obtain the specification information of the rechargeable battery, and configure the corresponding charging parameters to be sent to the corresponding constant current charge circuit, so as to charge the rechargeable battery through the constant current charge circuit. As a result, the effect of automatically recognize rechargeable batteries of different specifications can be realized, and the rechargeable batteries of different specifications can be simultaneously charged through multiple channels, which solves the problem that the existing technology of lithium battery charging cannot satisfy the need of simultaneously charging lithium batteries of different specifications.

DETAILED DESCRIPTION OF THE EMBODIMENTS

Example embodiments will now be described more fully with reference to the accompanying drawings.

In order to make objects, technical solutions, and advantages of the present application more comprehensible, the following further describes the present application in detail with reference to the accompanying drawings and embodiments. It should be understood that the specific embodiments described here are merely used for illustration of the present application, but do not intend to limit the present application.

Figure 1:
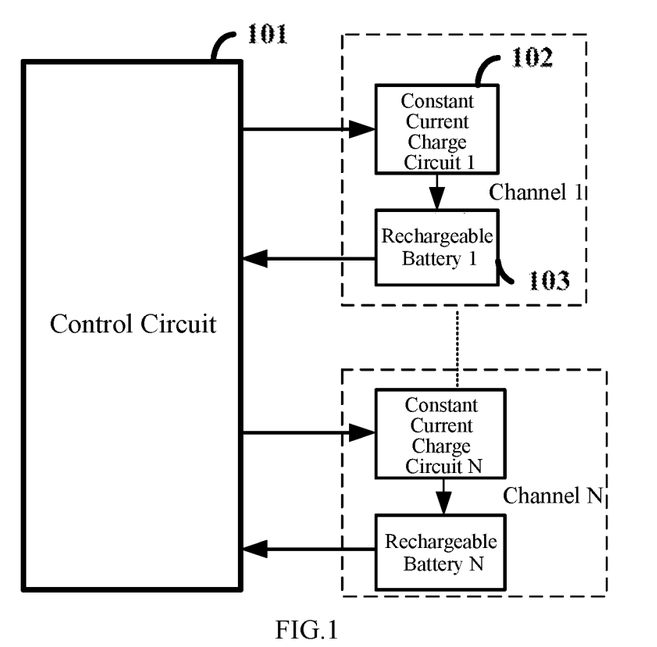
FIG. 1 is a schematic diagram of a block structure of a charge circuit in accordance with an embodiment of a first aspect of the present application.

FIG. 1 shows a block structure of a charge circuit in accordance with an embodiment of the first aspect of the present application. For ease of illustration, only the parts related to this embodiment are shown, as detailed below:

The aforementioned charge circuit includes a control circuit 101 and at least one constant current charge circuit 102.

The constant current charge circuit 102 is configured to be electrically connected with the rechargeable battery 103.

The control circuit 101 is electrically connected with the constant current charge circuit 102, and the control circuit 101 may also be configured to be connected with the rechargeable battery 103 and obtain its corresponding specification information, and configure corresponding charging parameters to be sent to the constant current charge circuit 102, so as to charging the rechargeable battery 103 through the constant current charge circuit 102.

As an example of the present application, the aforementioned rechargeable battery 103 includes but is not limited to a lithium battery, and the specification information of the rechargeable battery 103 includes real-time voltage, real-time current and battery capacity. The aforementioned charging parameters include charging voltage and charging current. The real-time voltage of the rechargeable battery 103 is obtained to configure corresponding charging voltage and charging current through the control circuit 101, so that the corresponding rechargeable battery 103 can be effectively charged through the constant current charge circuit 102. Also, the control circuit 101 can adjust the charging voltage and charging current in real time according to the real-time voltage of the rechargeable battery 103. For example, the maximum charging voltage of the lithium battery is 4.2V, when the real-time voltage of the lithium battery is detected to be lower than 3V, a pre-charging is carried out first, and the charging current is 1/10 of the set current; when the real-time voltage of the lithium battery rises to 3V, it enters a constant current charging process; when the real-time voltage of the lithium battery rises to 4.2V, it changes to a constant voltage charging and the charging voltage is remained at 4.2V.

It should be understood that, on the one hand, the control circuit 101 configures corresponding charging parameters according to the specification information of the rechargeable battery 103 obtained; on the other hand, it controls the corresponding constant current charge circuit 102 to work. Of course, the constant current charge circuit 102 and the rechargeable battery 103 connected to the corresponding charging interface form a charging channel. Therefore, when there are multiple constant current charge circuits, there are multiple charging channels respectively corresponding to the multiple constant current circuits.

When the charge level of the rechargeable battery 103 obtained through the control circuit 101 reaches a preset threshold, for example, the preset threshold is set to 98% of the total battery capacity, it is determined that the rechargeable battery 103 is fully charged, and the corresponding constant current charge circuit 102 is immediately controlled to stop working and the rechargeable battery 103 is no longer be charged, which has the effect of energy saving and emission reduction.

Exemplarily, when at least one constant current charge circuit is a plurality of constant current charge circuits, the control circuit 101 is connected to each constant current charge circuit, and each constant current charge circuit is connected to a corresponding rechargeable battery, such that the control circuit can obtain the specification information of multiple rechargeable batteries simultaneously, and after configuring the corresponding charging parameters, the multiple rechargeable batteries are respectively charged through the corresponding constant current charge circuit.

Figure 2:
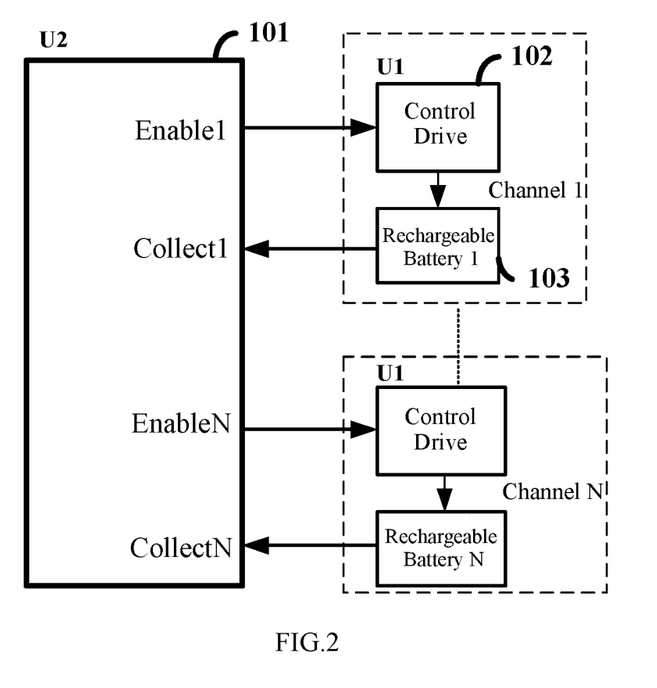
FIG. 2 is an exemplary circuit diagram of the corresponding charge circuit provided in FIG. 1.

Therefore, the aforementioned charge circuit realizes an effect of automatically identifying the rechargeable batteries 103 of different specifications, and satisfies a situation of charging the rechargeable battery 103 of different specifications simultaneously with multiple channels FIG. 2 shows an exemplary circuit corresponding to the charge circuit provided in FIG. 1. For ease of illustration, only the parts related to this embodiment are shown, as detailed below:

As an example, each of the aforementioned constant current charge circuits 102 includes a constant current switch-mode power supply control chip U1; a Control pin of the constant current switch-mode power supply control chip U1 is connected to the control circuit 101, and a Drive pin of the constant current switch-mode power supply control chip U1 is connected to the rechargeable battery 103. In this way, the constant current charge circuit 102 uses the constant current switch-mode power supply control chip U1, which is easy to implement.

As an example, the above-mentioned control circuit 101 includes a master chip U2. The master chip U2 generally uses a Microcontroller Unit (MCU), such as a single-chip microcomputer. The master chip U2 has an enable pin "Enable1" and a collection pin "Collect1", the pin of Enable1 is connected to the rechargeable battery 103 to obtain its corresponding specification information, and the pin of Collect1 is connected to the constant current charge circuit 102 for sending charging parameters to the constant current charge circuit 102.

Exemplarily, when at least one constant current charge circuit 102 is a plurality of constant current charge circuits, the master chip U2 is correspondingly added with multiple collection pins (indicated by Collect1 . . . CollectN in FIG.

2) and multiple enable pins (indicated by Enable1 . . . EnableN in FIG. 2), each constant current charge circuit 102 is respectively connected to an enable pin, and each rechargeable battery 103 is respectively connected to a collection pin.

Therefore, when there are multiple constant current charge circuits and the number is not too large, the use of the master chip U2 with multiply pins can achieve higher integration of the whole circuit.

Figure 3:
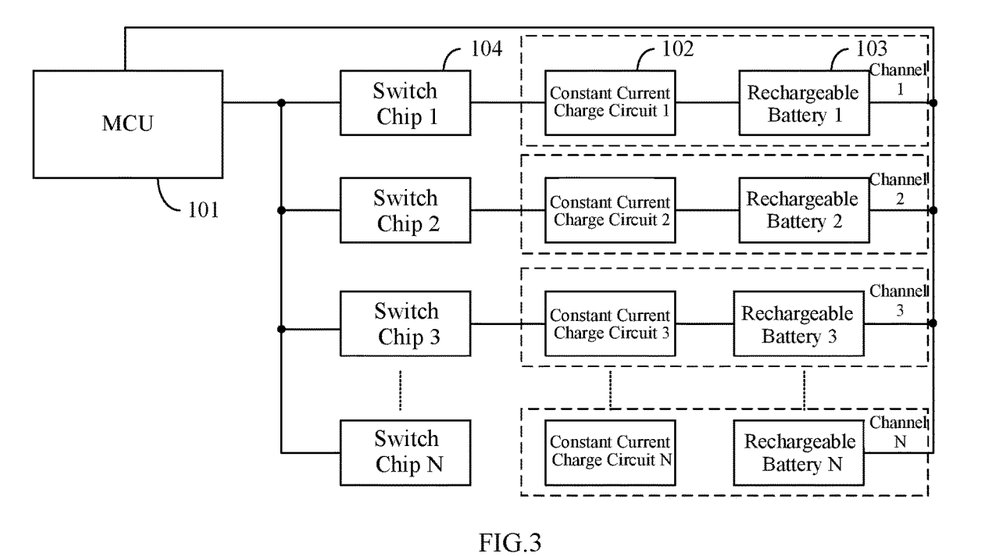
FIG. 3 is a schematic diagram of a block structure of a charge circuit in accordance with another embodiment of the first aspect of the present application.

FIG. 3 shows a block structure of a charge circuit in accordance with another embodiment of the first aspect of the present application, and only the parts related to this embodiment are shown, as detailed below:

On the basis of the embodiment shown in FIG. 1, the above-mentioned charge circuit also includes multiple switch chips (indicated by switch chip 1, switch chip 2, switch chip 3 . . . switch chip N in FIG. 3); each switch chip is connected to each constant current charge circuit in one-to-one correspondence, input pins of the multiple switch chips are connected in common to the enable pin of the master chip U2. The switch chip is configured to be switched on upon receiving a switch signal output by the control circuit, indicating the corresponding constant current charge circuit works. It can be understood that the more pins of the master chip, the higher the price. For example, a 16-pin master chip costs ¥16, while a 24-pin master chip may cost ¥20, but a single switch chip may only cost ¥0.2. That is, the cost of adding pins to the master chip U2 is much higher than the cost of using single switch chips with a simple function of switching. Therefore, it can effectively reduce costs by introducing multiple switch chips to reduce the number of pins of the master chip U2.

In this embodiment, multiple switch chips are provided to form branches and are uniformly controlled by the control circuit, which effectively reduces the pins of the master chip U2, and the constant current charge circuit can be operated by controlling ON/OFF of the corresponding switch chip.

It can be seen from FIG. 3 that, due to the multiple switch chips, enables the master chip U2 to control a plurality of constant current charge circuits with only one enable pin and one collection pin, and can charge the rechargeable battery through the constant current charge circuit.

Figure 4:
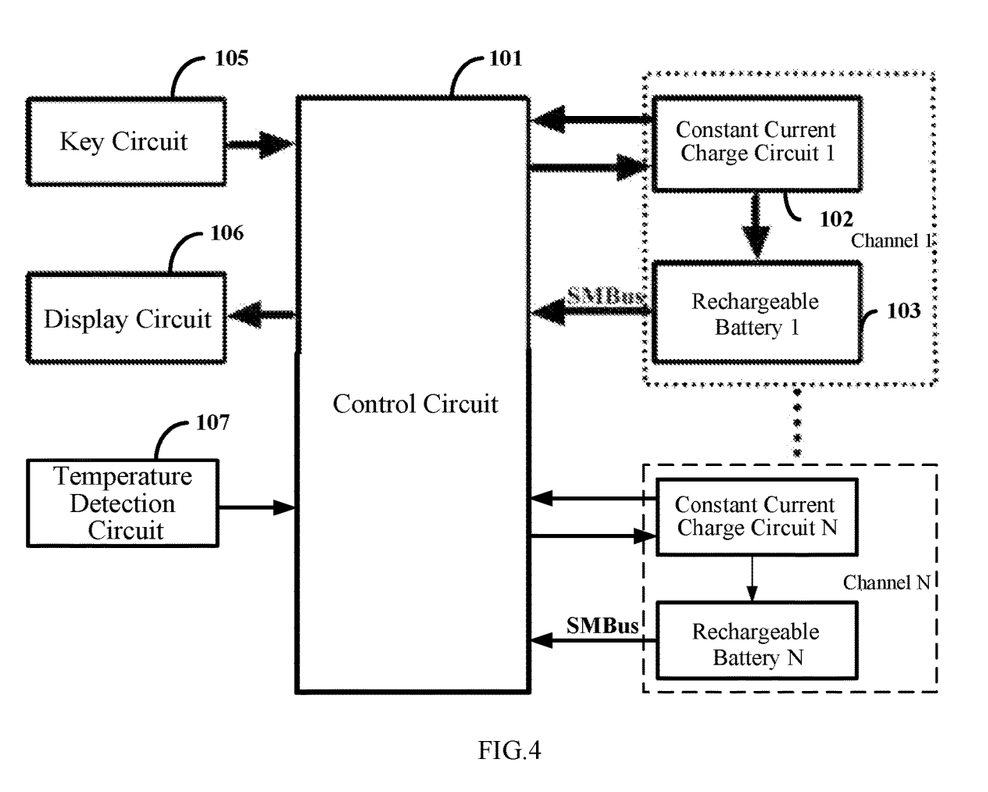
FIG. 4 is a schematic diagram of a block structure of a charge circuit in accordance with another embodiment of the first aspect of the present application.

FIG. 4 shows a block structure of a charge circuit in accordance with another embodiment of the first aspect of the present application, and only the parts related to this embodiment are shown, as detailed below:

On the basis of the embodiment shown in FIG. 1, the above-mentioned charge circuit further includes any one or more of a display circuit, a key circuit, and a temperature detection circuit.

Among them, the display circuit 106 is connected to the control circuit 101 and is configured to display status information of at least one constant current charge circuit 102 and the charging parameters of the rechargeable battery 103.

Specifically, the status information of the constant current charge circuit 102 includes a charging status and an idle status; the charging parameters of the rechargeable battery 103 include a charging voltage and a charging current. The control circuit 101, by obtaining the status information of the constant current charge circuit 102, and using the System Management Bus (SMbus) communication cable to obtain the charging current and charging voltage of the rechargeable battery 103 during charging, the status information of the constant current charge circuit 102 and the charging parameters of the rechargeable battery 103 are displayed via the display circuit 106.

It should be understood that the display circuit 106 is connected to the display screen, and the status information of the constant current charge circuit 102 and the charging parameters of the rechargeable battery 103 will eventually be displayed on the display screen in a form of pictures or text, so that the user can grasp the charging process in time.

Among them, the key circuit 105 is connected to the control circuit 101 and is configured to transmit the received key signal to the control circuit 101, so that the control circuit 101 adjusts the corresponding charging parameters according to the key signal.

Exemplarily, the key signal may include an open signal, a close signal, an increase signal and a decrease signal. The corresponding charging parameters are adjusted by the control circuit 101 according to the key signal, including: when the key signal is an open signal, the control circuit 101 controls the corresponding constant current charge circuit 102 to work; when the key signal is a close signal, the control circuit 101 controls the corresponding constant current charge circuit 102 to stop working; when the key signal is an increase signal, the control circuit 101 controls the corresponding constant current charge circuit 102 to increase the charging current; and when the key signal is a decrease signal, the control circuit 101 controls the corresponding constant current charge circuit 102 to decrease the charging current.

It should be understood that the key circuit 105 is connected to external keys, and when different keys are pressed, the key circuit 105 receives different key signals.

Among them, the temperature detection circuit 107 is connected to the control circuit 101, and is configured to detect the temperature in the preset area and feed it back to the control circuit 101 so that the control circuit 101 can adjust the corresponding charging parameters.

Specifically, the charging current can be adjusted according to the ambient temperature of the preset area around the rechargeable battery 103, and it can be determined whether to keep charging the rechargeable battery 103 or not. The preset area may be referred to an area with rechargeable battery 103 as the center, and the linear distance from the rechargeable battery 103 is within the preset range. For example, the preset area may be a circular area with a radius of 10 cm with the rechargeable battery 103 as the center. When it is detected that the temperature in the preset area exceeds the preset temperature value, the corresponding constant current charge circuit 102 is controlled to stop working by the control circuit 101 to stop charging, thereby achieving the effect of over-temperature protection and protection of the rechargeable battery 103.

Exemplarily, the above-mentioned key circuit 105 is implemented by a key switch, the display circuit 106 is implemented by a display chip, and the temperature detection circuit 107 is implemented by a thermistor.

Figure 5:
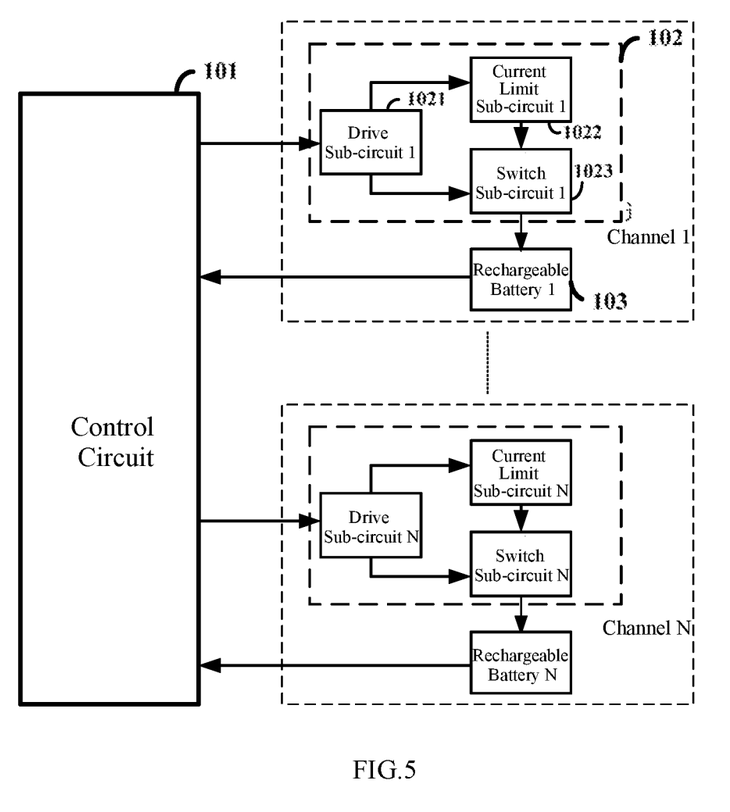
FIG. 5 is a schematic diagram of a unit structure of a constant current charge circuit in the charge circuit corresponding to FIG. 1.

FIG. 5 shows a unit structure of a constant current charge circuit in the charge circuit corresponding to FIG. 1. For ease of illustration, only the parts related to this embodiment are shown, as detailed below:

As an example of the present application, the aforementioned constant current charge circuit 102 includes a drive sub-circuit 1021, a current limit sub-circuit 1022, and a switch sub-circuit 1023.

The drive sub-circuit 1021 is configured to output a drive signal when receiving an enable signal.

The current limit sub-circuit 1022 is connected to the drive sub-circuit 1021 and is configured to receive a drive signal and convert it into a corresponding charging signal according to the charging parameters output by the control circuit 101 to charge the rechargeable battery 103 with a constant current.

The switch sub-circuit 1023 is connected to the drive sub-circuit 1021 and the current limit sub-circuit 1022, and is configured to be switched on only when a drive signal is received, otherwise it is off.

Figure 6:
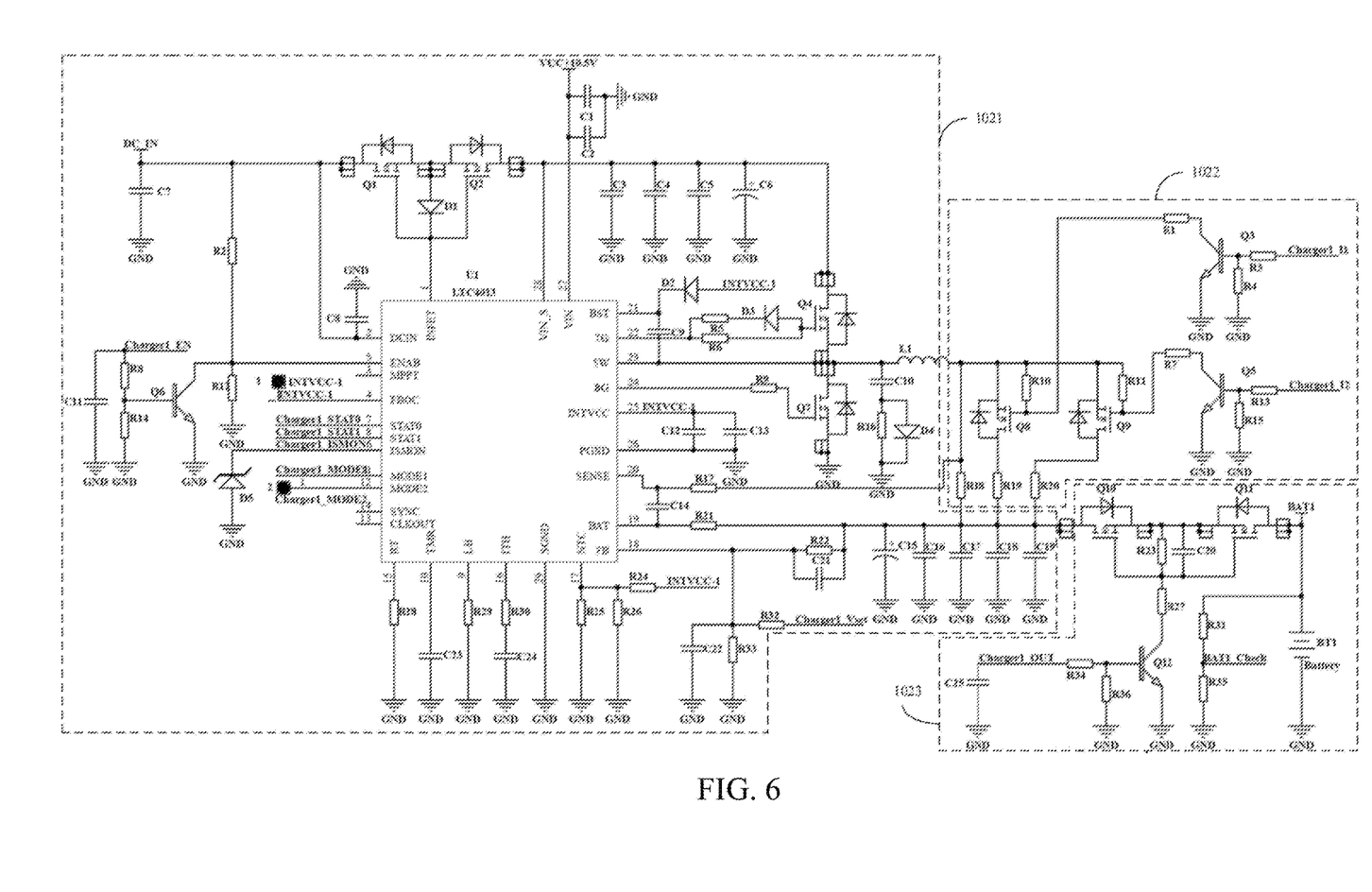
FIG. 6 is an exemplary circuit diagram of the constant current charge circuit in the charge circuit corresponding to FIG. 5.

FIG. 6 shows an exemplary circuit of the constant current charge circuit in the charge circuit corresponding to FIG. 5. For ease of illustration, only the parts related to this embodiment are shown, as detailed below:

Among them, the drive sub-circuit 1021 includes a constant current switch-mode power supply control chip U1, a first switch Q1, a second switch Q2, a fourth switch Q4, a sixth switch Q6, a seventh switch Q7, and a first capacitor C1, a second capacitor C2, a third capacitor C3, a fourth capacitor C4, a fifth capacitor C5, a sixth capacitor C6, a seventh capacitor C7, a eighth capacitor C8, a ninth capacitor C9, a tenth capacitor C10, a eleventh capacitor C11, a twelfth capacitor C12, a thirteenth capacitor C13, a fourteenth capacitor C14, a fifteenth capacitor C15, a sixteenth capacitor C16, a seventeenth capacitor C17, a eighteenth capacitor C18, a nineteenth capacitor C19, a twenty-first capacitor C21, a twenty-second capacitor C22, a twenty-third capacitor C23, a twenty-fourth capacitor C24, a second resistor R2, a fifth resistor R5, a sixth resistor R6, a eighth resistor R8, a ninth resistor R9, a twelfth resistor R12, a fourteenth resistor R14, a sixteenth resistor R16, a seventeenth resistor R17, a twenty-first resistor R21, a twenty-second resistor R22, a twenty-fourth resistor R24, a twenty-fifth resistor R25, a twenty-sixth resistor R26, a twenty-eighth resistor R28, a twenty-ninth resistor R29, a thirtieth resistor R30, a thirty-second resistor R32, a thirty-third resistor R33, a first diode D1, a second diode D2, a third diode D3, a fourth diode D4, a fifth diode D5, and a first inductor L1.

A first end of the seventh capacitor C7, a first end of the second resistor R2, a first end of the eighth capacitor C8 and an output end of the first switch Q1 are connected to an input pin of the constant current switch-mode power supply control chip U1. A second end of the seventh capacitor C7 and a second end of the eighth capacitor C8 are grounded. An input end of the first switch Q1, an input end of the second switch Q2 and the anode of the first diode D1 are connected in common. The cathode of first diode D1 is connected to a sense pin of the constant current switch-mode power supply control chip U1. An output end of the second switch Q2, a first end of the first capacitor C1, a first end of the second capacitor C2, a first end of the third capacitor C3, a first end of the fourth capacitor C4, a first end of the fifth capacitor C5, a first end of the sixth capacitor C6 and an output end of the fourth switch Q4 are connected in common. A second end of the first capacitor C1, a second end of the capacitor C2, a second end of the third capacitor C3, a second end of the fourth capacitor C4, a second end of the fifth capacitor C5 and a second end of the sixth capacitor C6 are grounded. A first end of the eighth resistor R8 is connected to a first end of the eleventh capacitor C11. A second end of the eighth resistor R8, a first end of the fourteenth resistor R14 and a controlled end of the sixth switch Q6 are connected in common. An input end of the sixth switch Q6, a second end of the second resistor R2 and a first end of the twelfth resistor R12 are connected to an enable pin of the constant current switch-mode power supply control chip U1. The cathode of the fifth diode D5 is connected to a detection pin of the constant current switch-mode power supply control chip U1. A second end of the eleventh capacitor C11, a second end of the fourteenth resistor R14, an output end of the sixth switch Q6, a second end of the twelfth resistor R12 and the anode of the fifth diode D5 are grounded. The cathode of the second diode D2 is connected to a first end of the ninth capacitor C9. A controlled end of the fourth switch Q4, the anode of the third diode D3 and a first end of the sixth resistor R6 are connected in common. The cathode of the third diode D3 is connected to a first end of the fifth resistor R5, a second end of the fifth resistor R5 and a second end of the sixth resistor R6 are connected to a transmission pin of the constant current switch-mode power supply control chip U1. An input end of the fourth switch Q4, an output end of the seventh switch Q7, a first end of the tenth capacitor C10, a first end of the first inductor L1 and a second end of the ninth capacitor C9 are connected to a switch pin of the constant current switch-mode power supply control chip U1. A second end of the first inductor L1 is connected to a first end of the seventeenth resistor R17. A controlled end of the seventh switch Q7, via the ninth resistor R9, is connected to the constant current switch-mode power supply control chip U1. An input end of the seventh switch Q7 is grounded. A first end of the twelfth capacitor C12 and a first end of the thirteenth capacitor C13 are connected to a drive pin of the constant current switch-mode power supply control chip U1. A second end of the twelfth capacitor C12 and a second end of the thirteenth capacitor C13 are grounded. A second end of the tenth capacitor C10, a first end of the sixteenth resistor R16 and the anode of the fourth diode D4 are connected in common. A second end of the sixteenth resistor R16 and the cathode of the fourth diode D4 are grounded. A first end of the fourteenth capacitor C14 is connected to a second end of the seventeenth resistor R17. A second end of the fourteenth capacitor C14 is connected to a first end of the twenty-first resistor R21. A first end of twenty-second resistor R22, a first end of the twenty-first capacitor C21, a first end of the twenty-second capacitor C22, a first end of the thirty-second resistor R32 and a first end of the thirty-third resistor R33 are connected to a feedback pin of the constant current switch-mode power supply control chip U1. A second end of the twenty-second capacitor C22 and a second end of the thirty-third resistor R33 are grounded. A second end of the twenty-first resistor R21, a second end of the twenty-second resistor R22, a second end of the twenty-first capacitor C21, a first end of the fifteenth capacitor C15, a first end of the sixteenth capacitor C16, a first end of the seventeenth capacitor C17, a first end of the eighteenth capacitor C18, and a first end of the nineteenth capacitor C19 are connected in common. A second end of the fifteenth capacitor C15, a second end of the sixteenth capacitor C16, a second end of the seventeenth capacitor C17, a second end of the eighteenth capacitor C18 and a second end of the nineteenth capacitor C19 are grounded. A first end of the twenty-fourth resistor R24, a first end of the twenty-fifth resistor R25 and a first end of the twenty-sixth resistor R26 are connected to a thermistor pin of the constant current switch-mode power supply control chip U1. A second end of the twenty-five resistor R25 and a second end of the twenty-six resistor R26 are grounded. A first end of the thirtieth resistor R30 is connected to another feedback pin of the constant current switch-mode power supply control chip U1. A second end of the thirtieth resistor R30 is connected to a first end of the twenty-fourth capacitor C24. A second end of the twenty-fourth capacitor C24 is grounded. A discharge pin of the constant current switch-mode power supply control chip U1, via the 29th resistor R29, is grounded. A charging time limit pin of the constant current switch-mode power supply control chip U1, via the twenty-third capacitor C23, is grounded. A current limit pin of the constant current switch-mode power supply control chip U1, via the twenty-eighth resistor R28, is grounded.

Among them, the aforementioned current limit sub-circuit 1022 includes a first resistor R1, a third resistor R3, a fourth resistor R4, a seventh resistor R7, a tenth resistor R10, an eleventh resistor R11, a thirteenth resistor R13, and a fifteenth resistor. R15, a eighteenth resistor R18, a nineteenth resistor R19, a twentieth resistor R20, a third switch Q3, a fifth switch Q5, a eighth switch Q8 and a ninth switch Q9.

A first end of the tenth resistor R10, an output end of the ninth switch Q9 and a first end of the eleventh resistor R11 are connected in common. A controlled end of the eighth switch Q8, a second end of the tenth resistor R10 and a first end of a resistor R1 are connected in common. An input end of the eighth switch Q8 is connected to a first end of the nineteenth resistor R19. A controlled end of the ninth switch Q9, a second end of the eleventh resistor R11 and a first end of the seven resistors R7 are connected in common. An input end of the ninth switch Q9 is connected to a first end of the twentieth resistor R20. A second end of the first resistor R1 is connected to an input end of the third switch Q3. A first end of the eighteenth resistor R18 is connected to the drive sub-circuit 1021. A second end of the eighteenth resistor R18, a second end of the nineteenth resistor R19 and a second end of the twentieth resistor R20 are connected in common. A controlled end of the third switch Q3, a first end of the third resistor R3 and a first end of the fourth resistor R4 are connected in common. An output end of the third switch Q3 and a second end of the fourth resistor R4 are grounded. A second end of the third resistor R3 is connected to a corresponding rechargeable battery 103. A second end of the seventh resistor R7 is connected to an input end of the fifth switch Q5. A controlled end of the fifth switch Q5, a first end of the thirteenth resistor R13 and a first end of the fifteenth resistor R15 are connected in common. An output end of the fifth switch Q5 and a second end of the fifteenth resistor R15 are grounded. A second end of the thirteenth resistor R13 is connected to a corresponding rechargeable battery 103.

Among them, the switch sub-circuit 1023 includes a twentieth capacitor C20, a twenty-fifth capacitor C25, a twenty-third resistor R23, a twenty-seventh resistor R27, a thirty-first resistor R31, a thirty-fourth resistor R34, and a thirty-five resistor R35, a thirty-sixth resistor R36, a tenth switch Q10, an eleventh switch Q11 and a twelfth switch Q12.

An input end of the tenth switch Q10 is connected to the drive sub-circuit 1021. An output end of the tenth switch Q10, a first end of the twenty-third resistor R23, a first end of the twentieth capacitor C20 and an output end of eleventh switch Q11 are connected in common. A controlled end of the tenth switch Q10, a second end of the twenty-third resistor R23, a second end of the twentieth capacitor C20, a controlled end of the eleventh switch Q11 and a first end of the seventeenth resistor R27 are connected in common. An input end of the eleventh switch Q11 is connected to a first end of the thirty-first resistor R31. A second end of the thirty-first resistor R31 is connected to a first end of the thirty-fifth resistor R35, A second end of the thirty-fifth resistor R35 is grounded. A second end of the twenty-seventh resistor R27 is connected to an input end of the twelfth switch Q12. A controlled end of the twelfth switch Q12, a first end of the thirty-fourth resistor R34 and a first end of the thirty-sixth resistor R36 are connected in common. A second end of the thirty-fourth resistor R34 is connected to a first end of the twenty-fifth capacitor C25. A second end of the thirty-sixth resistor R36 and a second end of the twenty-fifth capacitor C25 are grounded.

Specifically, the constant current switch-mode power supply control chip U1 may be a LTC4013 type constant current switch-mode power supply control chip. Of course, the type of the constant current switch-mode power supply control chip U1 is not limited, as long as it can achieve the same function as the constant current switch-mode power supply control chip U1 performed in this embodiment.

The charging status information (for example: standby, shutdown, charging, charging complete, battery failure and over-temperature information) may be obtained by the control circuit 101 through charging status pins STAT0 and STAT1 of the constant current switch-mode power supply control chip U1; and the sampling signal of the charging current is obtained by the control circuit 101 through the detection pin ISMON of the constant current switch-mode power supply control chip U1.

In the peripheral circuit of the constant current switch-mode power supply control chip U1, the first capacitor C1 and the second capacitor C2 are energy storage filter capacitors of the power input pin of the constant current switch-mode power supply control chip U1, the third capacitor C3, the fourth capacitor C4, the fifth capacitor C5, the sixth capacitor C6, the seventh capacitor C7 and the eighth capacitor C8 are input energy storage filter capacitors of the conversion topology of the constant current switch-mode power supply control chip U1; the fifteenth capacitor C15, the sixteenth capacitor C16, and the seventeenth capacitor C17, the eighteenth capacitor C18 and the nineteenth capacitor C19 are output energy storage filter capacitors of the conversion topology of the constant current switch-mode power supply control chip U1; the first switch Q1, the second switch Q2 and the first diode D1 is used to prevent current backflow when the input voltage is lower than the voltage of the rechargeable battery 103, meanwhile, this function can also be used to realize the maximum power point tracking when the input is a solar device. In addition, DC-IN is the charging input pin; meanwhile, in order to avoid the problem of high heat generation, the external power supply outputs a voltage of 10.5V, the constant current switch-mode power supply control chip U1 is powered through an end of VCC+10.5V.

In addition, the first resistor R1, the third resistor R3, the fourth resistor R4, the seventh resistor R7, the tenth resistor R10, the eleventh resistor R11, the thirteenth resistor R13, the fifteenth resistor R15, the eighteenth resistor R18, the nineteenth resistor R19, the twentieth resistor R20, the eighth switch Q8 and the ninth switch Q9 constitute a variable current-limiting resistor network, which can be output by the control circuit 101 to change the current-limiting resistance value. When the circuit 101 outputs a high level, the eighth switch Q8 and the ninth switch Q9 are switched on, meanwhile, the current limiting resistance value of the sampled current limit sub-circuit 1022 becomes smaller, and the charging current becomes larger. When the control circuit 101 outputs a low level, the eighth switch Q8 and the ninth switch Q9 are switched off, meanwhile, the current-limiting resistance value of the sampled current limit sub-circuit 1022 becomes larger, and the charging current becomes smaller; the twentieth capacitor C20, the twenty-fifth capacitor C25, the twenty-third resistor R23, the twenty-seventh resistor R27, the thirty-first resistor R31, thirty-fourth resistor R34, the thirty-fifth resistor R35, the thirty-sixth resistor R36, the tenth switch Q10, the eleventh switch Q11 and the twelfth switch Q12 constitute a charging output of the switch sub-circuit 1023 and are controlled by the control circuit 101. After the system obtains the battery information and configures the charging parameters, the output switch is switched on, that is, the switch sub-circuit 1023 is controlled to be turned on. The voltage division signals provided by the thirty-first resistor R31 and the thirty-fifth resistor R35 to the control circuit 101 are used for the rechargeable battery 103 to sample a voltage of the battery end.

The twenty-eighth resistor R28 is a set resistor for operating frequency of the chip, the twenty-third capacitor C23 sets the charging time of the constant current switch-mode power supply control chip U1, the twenty-fourth resistor R24, the twenty-fifth resistor R25 and the twenty-sixth resistor R26 serve as the charging temperature compensation circuit. The twenty-ninth resistor R29 sets the trickle charging voltage value (that is, when the battery voltage is lower than the voltage, first use a small current to charge the rechargeable battery 103, and wait until the voltage of the rechargeable battery 103 is higher than the set voltage, it switches to constant current charging to protect the battery). The twenty-fourth capacitor C24 and the thirtieth resistor R30 are the compensation of the switch-mode power supply control loop. The twenty-first capacitor C21, the twenty-second capacitor C22, the twenty-second resistor R22, the thirty-second resistor R32, and the thirty-third resistor R33 form a negative voltage feedback network.

In this embodiment, the first switch Q1, the second switch Q2, the third switch Q3, the fourth switch Q4, the fifth switch Q5, the sixth switch Q6, the seventh switch Q7, the eighth switch Q8, the ninth switch Q9, the tenth switch Q10, the eleventh switch Q11, and the twelfth switch Q12 may be field effect transistors, or triodes, or a combination of field effect transistors and triodes.

Figure 7:
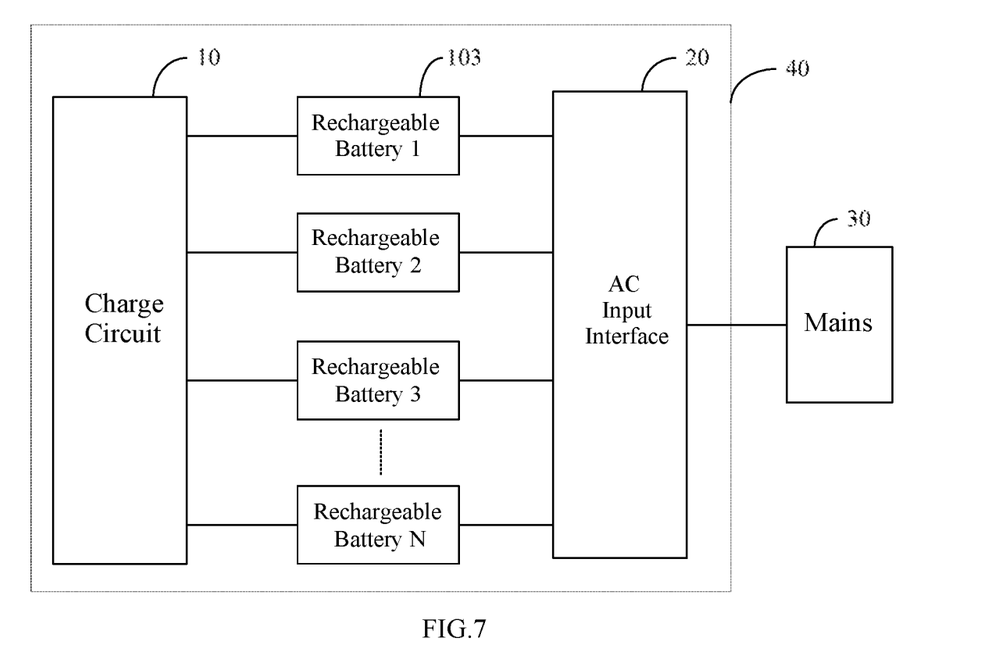
FIG. 7 is a schematic structural diagram of a control box in accordance with a second aspect of the present application.

FIG. 7 shows a block structure of a control box in accordance with the second aspect of the present application. For ease of illustration, only the parts related to this embodiment are shown, as described below:

The application also provides a control box 40, including:

AC input interface 20 which is configured to connect to mains 30;

Multiple sets of rechargeable batteries 103 which are electrically connected to the AC input interface 20, and the multiple sets of rechargeable batteries 103 are configured to receive the mains 30 through the AC input interface 20 to charge themselves; and The above-mentioned charge circuit 10 which is electrically connected to the multiple sets of rechargeable batteries 103, and the charge circuit 10 is configured to charge the rechargeable batteries 103.

It should be noted that the control box 40 adds an AC input interface 20 and multiple sets of rechargeable batteries 103 on the basis of the above charge circuit. Therefore, regarding function descriptions and principle illustrations of the control circuit 101, the constant current charge circuit 102, the switch chip 104, the key circuit 105, the display circuit 106 and the temperature detection circuit 107 in the charge circuit, embodiments of FIG. 1 to FIG. 6 may be referred to and will not be described in detail here.

The multiple sets of rechargeable batteries 103 can receive the mains power through the AC input interface 20 to charge themselves, and can also be charged through the aforementioned charge circuit 10. Therefore, when the mains power is abnormal or the power is cut off, the multiple sets of rechargeable batteries can continue to maintain a charged state, so that the control box 40 continues to work, which improves the user experience.

Figure 8:
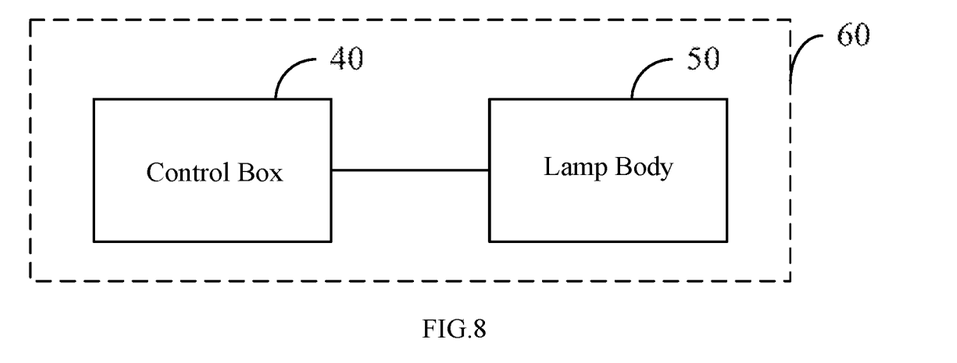
FIG. 8 is a schematic structural diagram of a control box in accordance with a third aspect of the present application.

FIG. 8 shows a block structure of a luminaire in accordance with the third aspect of the present application. For ease of illustration, only the parts related to this embodiment are shown, as detailed below:

The present application also provides a luminaire 60, which includes a lamp body 50 and a control box 40 as described above. The control box 40 is electrically connected to the lamp body 50 for supplying power to the lamp body 50.

It should be understood that, on the one hand, the above-mentioned control box 40 supplies power to the lamp body 50 to illuminate the lamp body; on the other hand, the lamp body 50 is dimmed and toned by the control box 40. In addition, controlling the lamp body 50 by the control box 40 includes wired control and wireless control.

The above-mentioned charge circuit, control box and luminaire achieve automatic identification of rechargeable batteries of various specifications, the corresponding charging voltage and charging current can be set according to different rechargeable batteries, and it has multiple channels to achieve the effect of charging different specifications of rechargeable batteries simultaneously, so it can meet more rechargeable battery application scenarios.

Specifically, the above-mentioned charge circuit, control box and luminaire have the following advantages:

1. The control circuit is responsible for communicating with the rechargeable battery to obtain the specification information of the rechargeable battery (including single channel and multi-channel), and configure the charging parameters of the corresponding rechargeable battery and display the status information of each channel;

2. The constant current charge circuit uses an IC that automatically controls the cyclic charging of the rechargeable battery to reduce the occupation of MCU resources and simultaneously reduce the workload of program development;

3. When there are multiple channels, it only need to add enable pins and collection pins to the MCU, thereby achieving a high integration circuit; or by introducing multiple switch chips to reduce the number of pins of the master chip, thereby effectively reducing costs.

The working principles of the above-mentioned charge circuit, control box, and luminaire are described as follow in conjunction with FIGS. 1 to 8:

The communication technology between the control circuit 101 and the rechargeable battery 103 uses the SMBus communication cable. The control circuit 101 first obtains the real-time voltage of each rechargeable battery 103 through the SMBus communication cable, then configures the corresponding charging voltage and charging current for each constant current charge circuit 102, and then enables the corresponding constant current charge circuit 102, and finally the output switch of the constant current charge circuit 102 is switched on for charging.

During charging, the control circuit 101 can obtain the charging status of the constant current charge circuit 102 and the charging current and charging voltage parameters during charging, which can be used for judgment and displayed on the display screen.

Of course, the control circuit 101 can adjust the corresponding charging parameters according to the received key signal.

Moreover, when the temperature of the preset area around the rechargeable battery 103 exceeds a preset value or the battery is fully charged, the control circuit 101 controls the corresponding constant current charge circuit 102 to stop working so as to stop charging the rechargeable battery 103.

In summary, a charge circuit, a control box, and a luminaire are provided by the embodiments of the present application. The charge circuit includes a control circuit and at least one constant current charge circuit. The constant current charge circuit is electrically connected to the rechargeable battery. The control circuit is used to obtain the specification information of the rechargeable battery, and configure the corresponding charging parameters to be sent to the corresponding constant current charge circuit, so as to charge the rechargeable battery through the constant current charge circuit. As a result, the effect of automatically recognize rechargeable batteries of different specifications can be realized, and meet the situation where the rechargeable batteries of different specifications can be simultaneously charged through multiple channels, which solves the problem that the existing technology of lithium battery charging cannot satisfy simultaneously charging lithium batteries of different specifications.

The foregoing description are merely preferred embodiments of the present application, and are not intended to limit the present application; any modifications, equivalent substitutions and improvements made within the spirit and principles of the disclosure should be understood as being included within the scope of the present application.

What is claimed is:

1. A charge circuit, comprising:
    at least one constant current charge circuit, wherein the constant current charge circuit is configured to electrically connect with a rechargeable battery;
    a control circuit electrically connected to the constant current charge circuit, and wherein the control circuit is further configured to be electrically connected to the rechargeable battery, to obtain its corresponding specification information, and to configure corresponding charging parameters to be sent to the constant current charge circuit, so as to charge the rechargeable battery through the constant current charge circuit; and
    a plurality of switch chips, each of the switch chips is connected to a corresponding constant current charge circuit in a one-to-one relationship, and input pins of a plurality of the switch chips are connected in common to the control circuit, the switch chip is configured to be switched on when receiving a switch signal output by the control circuit to instruct the corresponding constant current charge circuit to work.

2. The charge circuit according to claim 1, wherein the constant current charge circuit comprises a constant current switch-mode power supply control chip;
    a control pin of the constant current switch-mode power supply control chip is connected to the control circuit, and a drive pin of the constant current switch-mode power supply control chip is connected to the rechargeable battery.

3. A charge circuit, comprising:
    at least one constant current charge circuit, wherein the constant current charge circuit is configured to electrically connect with a rechargeable battery; and
    a control circuit, electrically connected to the constant current charge circuit, wherein the control circuit is further configured to be electrically connected to the rechargeable battery, to obtain its corresponding specification information, and to configure corresponding charging parameters to be sent to the constant current charge circuit, so as to charge the rechargeable battery through the constant current charge circuit,
    wherein the control circuit comprises a master chip,
    wherein the master chip has a collection pin and an enable pin, the collection pin is connected to the rechargeable battery for obtaining its corresponding specification information, and the enable pin is connected to the constant current charge circuit for sending the charging parameters to the constant current charge circuit,
    wherein when the at least one constant current charge circuit is a plurality of constant current charge circuits, there are a plurality of collection pins, and a plurality of enable pins, and
    wherein one of the constant current charge circuits is connected to one of the enable pins, and one of the rechargeable batteries is connected to one of the collection pins.

4. The charge circuit according to claim 1, wherein the constant current charge circuit comprises:
    a drive sub-circuit which is configured to output a drive signal after receiving an enable signal output by the control circuit;
    a current limit sub-circuit which is connected to the drive sub-circuit, and is configured to receive the drive signal and convert it into a corresponding charging signal according to the charging parameters, so as to charge the rechargeable battery with constant current; and
    a switch sub-circuit which is connected to the drive sub-circuit and the current limit sub-circuit, and is configured to be switched on only when the drive signal is received, otherwise it is off.

5. The charge circuit of claim 4, wherein the current limit sub-circuit comprises:
    a first resistor, a third resistor, a fourth resistor, a seventh resistor, a tenth resistor, an eleventh resistor, a thirteenth resistor, a fifteenth resistor, an eighteenth resistor, a nineteenth resistor, a twentieth resistor, a third switch, a fifth switch, an eighth switch and ninth switch;
    wherein a first end of the tenth resistor, an output end of the ninth switch and a first end of the eleventh resistor are connected in common; a controlled end of the eighth switch, a second end of the tenth resistor and a first end of the first resistor are connected in common; an input end of the eighth switch is connected to a first end of the nineteenth resistor; a controlled end of the ninth switch, a second end of the eleventh resistor and a first end of the seventh resistor are connected in common; An input end of the ninth switch is connected to a first end of the twentieth resistor; a second end of the first resistor is connected to an input end of the third switch; a first end of the eighteenth resistor is connected to the drive sub-circuit; a second end of the eighteenth resistor, a second end of the nineteenth resistor and a second end of the twentieth resistor are connected in common; a controlled end of the third switch, a first end of the third resistor and a first end of the fourth resistor are connected in common; an output end of the third switch and a second end of the fourth resistor are grounded; a second end of the third resistor is connected to a corresponding rechargeable battery; a second end of the seventh resistor is connected to an input end of the fifth switch; a controlled end of the fifth switch, a first end of the thirteenth resistor and a first end of the fifteenth resistor are connected in common; an output end of the fifth switch and a second end of the fifteenth resistor are grounded, and a second end of the thirteenth resistor is connected to a corresponding rechargeable battery.

6. The charge circuit according to claim 4, wherein the switch sub-circuit comprises:
a twentieth capacitor, a twenty-fifth capacitor, a twenty-third resistor, a twenty-seventh resistor, a thirty-first resistor, a thirty-fourth resistor, a thirty-fifth resistor, a thirty-sixth resistor, a tenth switch, an eleventh switch and a twelfth switch;
wherein an input end of the tenth switch is connected to the drive sub-circuit; an output end of the tenth switch, a first end of the twenty-third resistor, a first end of the twentieth capacitor and an output end of the eleventh switch are connected in common; a controlled end of the tenth switch, a second end of the twenty-third resistor, a second end of the twentieth capacitor, a controlled end of the eleventh switch, and a first end of the twenty-seventh resistor are connected in common; an input end of the eleventh switch is connected to a first end of the thirty-first resistor; a second end of the thirty-first resistor is connected to a first end of the thirty-fifth resistor; a second end of the thirty-fifth resistor is grounded; a second end of the twenty-seventh resistor is connected to an input end of the twelfth switch; a controlled end of the twelfth switch, a first end of the thirty-fourth resistor and a first end of the thirty-sixth resistor are connected in common; a second end of the thirty-fourth resistor is connected to a first end of the twenty-fifth capacitor, and a second end of the thirty-sixth resistor and a second end of the twenty-fifth capacitor are grounded.

7. The charge circuit according to claim 1, wherein the charge circuit further comprises any one or more of a display circuit, a key circuit, and a temperature detection circuit;
the display circuit is connected to the control circuit, and is configured to display a status information of the at least one constant current charge circuit and the charging parameters of the rechargeable battery;
the key circuit is connected to the control circuit, and is configured to transmit the received key signal to the control circuit to instruct the control circuit to adjust the corresponding charging parameters; and
the temperature detection circuit is connected to the control circuit, and is configured to detect a temperature in a preset area and feed it back to the control circuit to instruct the control circuit to adjust the corresponding charging parameters.

8. A luminaire, comprising:
a lamp body and
a control box which is electrically connected to the lamp body for supplying power to the lamp body, wherein the control box comprises:
an AC input interface configured for connecting to mains;
multiple sets of rechargeable batteries which are electrically connected to the AC input interface, and the multiple sets of the rechargeable batteries are configured to receive main power through the AC input interface for charging itself; and
a charge circuit which is electrically connected to the multiple sets of the rechargeable batteries and is configured to charge the rechargeable batteries, wherein the charge circuit comprises:
at least one constant current charge circuit, wherein the constant current charge circuit is configured to electrically connect with the multiple sets of the rechargeable batteries;
a control circuit electrically connected to the constant current charge circuit, and wherein the control circuit is further configured to be electrically connected to the multiple sets of the rechargeable batteries, to obtain corresponding specification information of the multiple sets of the rechargeable batteries, and to configure corresponding charging parameters to be sent to the constant current charge circuit, so as to charge the multiple sets of the rechargeable batteries through the constant current charge circuit; and
a plurality of switch chips, each of the switch chips is connected to a corresponding constant current charge circuit in a one-to-one relationship, and input pins of a plurality of the switch chips are connected in common to the control circuit, the switch chip is configured to be switched on when receiving a switch signal output by the control circuit to instruct the corresponding constant current charge circuit to work.

9. The charge circuit according to claim 3, wherein the constant current charge circuit comprises:
a drive sub-circuit which is configured to output a drive signal after receiving an enable signal output by the control circuit;
a current limit sub-circuit which is connected to the drive sub-circuit, and is configured to receive the drive signal and convert it into a corresponding charging signal according to the charging parameters, so as to charge the rechargeable battery with constant current; and
a switch sub-circuit which is connected to the drive sub-circuit and the current limit sub-circuit, and is configured to be switched on only when the drive signal is received, otherwise it is off.

10. The charge circuit of claim 9, wherein the current limit sub-circuit comprises:
a first resistor, a third resistor, a fourth resistor, a seventh resistor, a tenth resistor, an eleventh resistor, a thirteenth resistor, a fifteenth resistor, an eighteenth resistor, a nineteenth resistor, a twentieth resistor, a third switch, a fifth switch, an eighth switch and ninth switch;
wherein a first end of the tenth resistor, an output end of the ninth switch and a first end of the eleventh resistor are connected in common; a controlled end of the eighth switch, a second end of the tenth resistor and a first end of the first resistor are connected in common; an input end of the eighth switch is connected to a first end of the nineteenth resistor; a controlled end of the ninth switch, a second end of the eleventh resistor and a first end of the seventh resistor are connected in common; An input end of the ninth switch is connected to a first end of the twentieth resistor; a second end of the first resistor is connected to an input end of the third switch; a first end of the eighteenth resistor is connected to the drive sub-circuit; a second end of the eighteenth resistor, a second end of the nineteenth resistor and a second end of the twentieth resistor are connected in common; a controlled end of the third switch, a first end of the third resistor and a first end of the fourth resistor are connected in common; an output end of the third switch and a second end of the fourth resistor are grounded; a second end of the third resistor is connected to a corresponding rechargeable battery; a second end of the seventh resistor is connected to an input end of the fifth switch; a controlled end of the fifth switch, a first end of the thirteenth resistor and a first end of the fifteenth resistor are connected in common; an output end of the fifth switch and a second end of the fifteenth resistor are grounded, and a second end of the thirteenth resistor is connected to a corresponding rechargeable battery.

11. The charge circuit according to claim 9, wherein the switch sub-circuit comprises:
a twentieth capacitor, a twenty-fifth capacitor, a twenty-third resistor, a twenty-seventh resistor, a thirty-first resistor, a thirty-fourth resistor, a thirty-fifth resistor, a thirty-sixth resistor, a tenth switch, an eleventh switch and a twelfth switch;
wherein an input end of the tenth switch is connected to the drive sub-circuit; an output end of the tenth switch, a first end of the twenty-third resistor, a first end of the twentieth capacitor and an output end of the eleventh switch are connected in common; a controlled end of the tenth switch, a second end of the twenty-third resistor, a second end of the twentieth capacitor, a controlled end of the eleventh switch, and a first end of the twenty-seventh resistor are connected in common; an input end of the eleventh switch is connected to a first end of the thirty-first resistor; a second end of the thirty-first resistor is connected to a first end of the thirty-fifth resistor; a second end of the thirty-fifth resistor is grounded; a second end of the twenty-seventh resistor is connected to an input end of the twelfth switch; a controlled end of the twelfth switch, a first end of the thirty-fourth resistor and a first end of the thirty-sixth resistor are connected in common; a second end of the thirty-fourth resistor is connected to a first end of the twenty-fifth capacitor, and a second end of the thirty-sixth resistor and a second end of the twenty-fifth capacitor are grounded.

12. The charge circuit according to claim 3, wherein the charge circuit further comprises any one or more of a display circuit, a key circuit, and a temperature detection circuit;
the display circuit is connected to the control circuit, and is configured to display a status information of the at least one constant current charge circuit and the charging parameters of the rechargeable battery;
the key circuit is connected to the control circuit, and is configured to transmit the received key signal to the control circuit to instruct the control circuit to adjust the corresponding charging parameters; and
the temperature detection circuit is connected to the control circuit, and is configured to detect a temperature in a preset area and feed it back to the control circuit to instruct the control circuit to adjust the corresponding charging parameters.

\* \* \* \* \*